March 24, 1931. A. SCHOPPER 1,797,734
APPARATUS FOR TESTING THE TENSILE STRENGTH OF FLEXIBLE MATERIALS
Filed March 8, 1929

Inventor:
Alfred Schopper
by Kleinhauer
Atty.

Patented Mar. 24, 1931

1,797,734

UNITED STATES PATENT OFFICE

ALFRED SCHOPPER, OF LEIPZIG, GERMANY, ASSIGNOR TO THE FIRM LOUIS SCHOPPER, OF LEIPZIG, GERMANY

APPARATUS FOR TESTING THE TENSILE STRENGTH OF FLEXIBLE MATERIALS

Application filed March 8, 1929, Serial No. 345,505, and in Germany February 1, 1927.

My invention relates to apparatus for testing the tensile strength of flexible materials by inflation. It is an object of my invention to provide an apparatus in which the area subjected to inflating pressure may be varied.

To this end I provide exchangeable parts for supporting the part to be tested.

In an apparatus embodying my invention the part under test which is inflated by gas under pressure is held between a plate and a cup-shaped jaw. By providing exchangeable parts as explained above, the area subjected to pressure may be varied so that, for instance, parts of high tensile strength may be tested under comparatively low air pressure.

In order to obtain uniform contact at the areas where the part under test is held, I may provide a resilient insertion for one of the parts.

In the drawings affixed to this specification and forming part thereof apparatus embodying my invention is illustrated diagrammatically by way of example.

In the drawings

Figure 1:
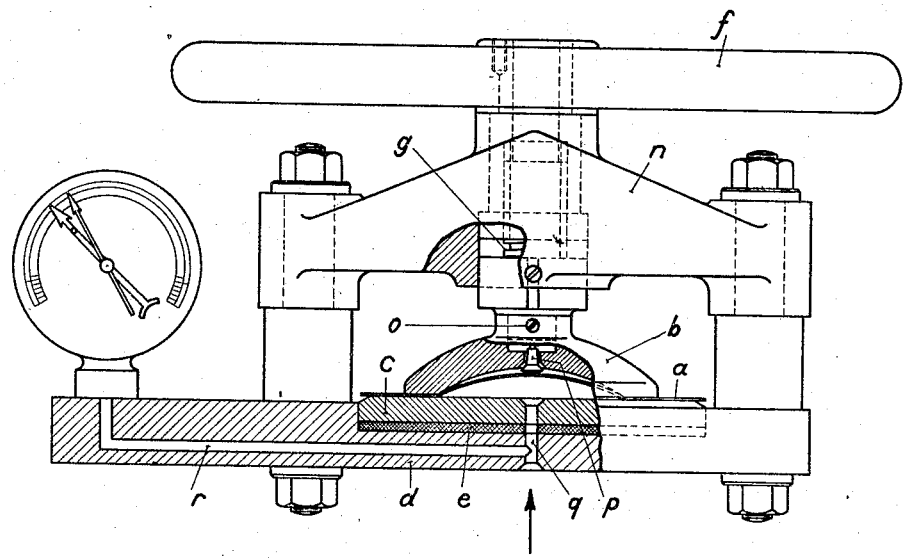
Fig. 1 is an elevation of a testing apparatus, partly in section.

Referring now to the drawings, $d$ is the foundation plate of the apparatus to which a yoke $n$ is secured. $a$ is the part under test, $c$ is an anvil plate inserted in the foundation plate $d$, $e$ is the afore-mentioned resilient insertion below the anvil plate $c$ which must not be confused with the resilient packing ring provided in apparatus for testing the permeability of leather and other materials, $b$ is a cup-shaped jaw adapted to hold the part $a$ down on the anvil plate $c$, $g$ is a threaded spindle in the yoke $n$, and $f$ is a handwheel for rotating the spindle. The cup-shaped jaw $b$ is detachably secured to the end of the spindle $g$ and held thereon by a screw $o$ so that it may be readily exchanged in order to vary the area under pressure for the object specified. $p$ is a plunger adapted to engage the part $a$ on its convex side so as to be displaced in conformity with its inflation and to operate a gauge, not shown, for measuring the camber of the inflated part.

$q$ is a passage in the foundation plate $d$, the insertion $e$ and the anvil plate $c$, and a source of gas or air under pressure, not shown, is connected to the passage $q$. $r$ is a bore in the foundation plate which connects the passage $q$ with a pressure gauge $s$.

In operation, pressure is admitted to the space below the part $a$ and the part is inflated until it bursts, its camber being measured by the gauge connected with the plunger $p$.

Figure 2:
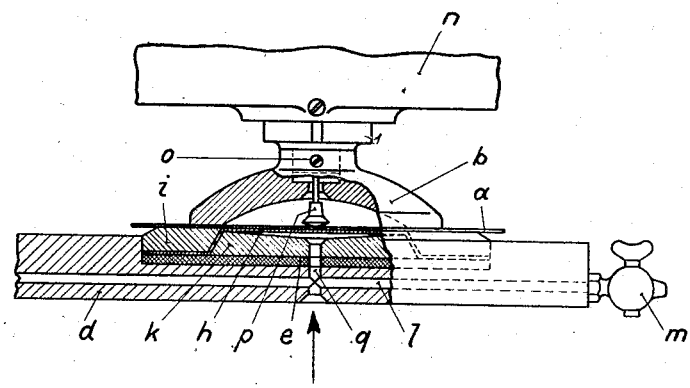
Fig. 2 is an elevation, also partly in section, showing part of an apparatus which has been modified for the testing of very permeable materials.

With highly permeable materials the loss of air percolating through the pores of the part under test is so considerable as to interfere with the testing. In order to prevent this, a film $h$ of impermeable material, such as rubber, is inserted between the part $a$ and the anvil plate $i$ on which the part under test is held by the jaw $b$ as shown in Fig. 2. The anvil plate $i$ corresponds to the plate $c$, Fig. 1, and is also supported on a resilient insertion $e$, but it is annular and provided with a solid inserted plate $k$ by which the film $h$ is held on the, preferably tapering, faces of the plates $i$ and $k$. As shown in Fig. 2 the edge of the film $h$ is turned over about the face of the plate $k$ so that it is held under tension when the plate $k$ is in position, and it is not necessary to smooth the film before the test.

It is not indispensable that the film $h$ should be secured in the manner described but it may be simply placed below the part $a$ on the undivided anvil plate $c$ as in Fig. 1.

In order to readily return the film $h$ to its initial position after each test, a passage $l$ may be connected with the passage $q$ and provided with a cock $m$ through which the air below the film $h$ is discharged.

It is understood that not only the jaw $b$ but also the plates $c$, $i$ and $k$ may be exchangeable.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An apparatus for testing the tensile strength of flexible materials by inflation comprising means for supplying gas under pressure to one side of the part under test, and exchangeable means of geometrically similar configuration for holding said part.

2. An apparatus for testing the tensile strength of flexible materials by inflation comprising means for supplying gas under pressure to one side of the part under test, a foundation plate, exchangeable means of geometrically similar configuration for holding said part, and a resilient insertion between one of said means and said foundation plate.

3. An apparatus for testing the tensile strength of flexible materials by inflation comprising means for supplying gas under pressure to one side of the part under test, a foundation plate, exchangeable means of geometrically similar configuration for holding said part comprising an anvil plate inserted in said foundation plate, and a resilient insertion between said anvil and said foundation plate.

4. An apparatus for testing the tensile strength of flexible materials by inflation comprising means for supplying gas under pressure to one side of the part under test, an exchangeable cup-shaped jaw adapted to engage said part on one side, and a resilient support on the other side.

5. An apparatus for testing the tensile strength of flexible materials by inflation comprising means for supplying gas under pressure to one side of the part under test, exchangeable means for holding said part, and a film of impermeable material applied to one side of said part.

6. An apparatus for testing the tensile strength of flexible materials by inflation comprising means for supplying gas under pressure to one side of the part under test, a foundation plate, an anvil plate inserted in said foundation plate, and means for securing a film of impermeable material to said anvil plate.

7. An apparatus for testing the tensile strength of flexible materials by inflation comprising means for supplying gas under pressure to one side of the part under test, a foundation plate, an annular anvil plate inserted in said foundation plate, a plate adapted to be inserted in said annular anvil plate, and a film of impermeable material on said inserted plate, the edge of said film being held between the mating faces of said annular anvil plate and said inserted plate.

8. An apparatus for testing the tensile strength of flexible materials by inflation comprising means for supplying gas under pressure to one side of the part under test, a foundation plate, an annular anvil plate having a tapered seat and inserted in said foundation plate, a plate adapted to fit said seat in said annular anvil plate, and a film of impermeable material on said inserted plate, the edge of said film being held between the mating faces of said annular anvil plate and said inserted plate.

In testimony whereof I affix my signature.

ALFRED SCHOPPER.